May 30, 1950 E. UNDERHILL 2,509,323
CURRENT TOW MOTOR
Filed Dec. 15, 1948

INVENTOR.
Eliot Underhill
BY
Att'y

Patented May 30, 1950

2,509,323

UNITED STATES PATENT OFFICE 2,509,323

CURRENT TOW MOTOR

Eliot Underhill, San Francisco, Calif.

Application December 15, 1948, Serial No. 65,351

3 Claims. (Cl. 115—0.5)

This invention relates to a current tow motor and has to do with a device for towing a line or other equipment attached thereto away from the starting point through the effect of fluid currents engaging the same, as, for instance, the flow of a stream or the wave action adjacent a shore line.

The principal object of this invention is to produce a device of the character described which may be immersed in the current and, irrespective of the position in which it falls, it will immediately adjust itself so as to furnish power to drag a line or other equipment, such as a crab net or fishing net, to a point remote from the operator.

A further object is to produce a device which will automatically adjust itself to the ebb and flow of wave action and which will automatically resist retrograde movement.

A further object is to provide means for retrieving the device.

Other objects and advantages will be apparent during the course of the following description.

Figure 1:
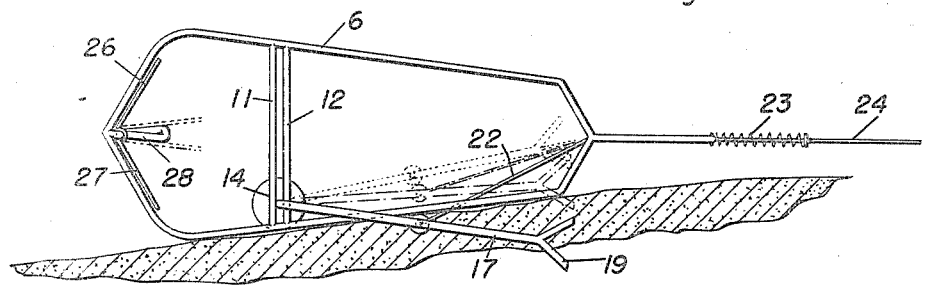
Figure 2:
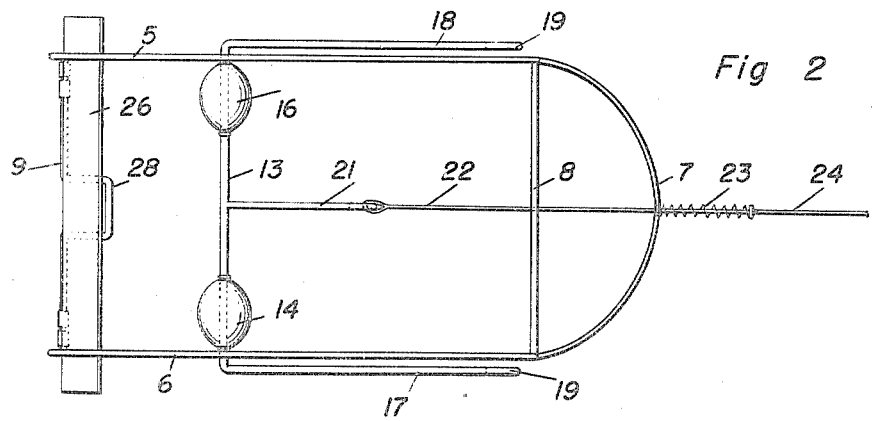
Figure 3:
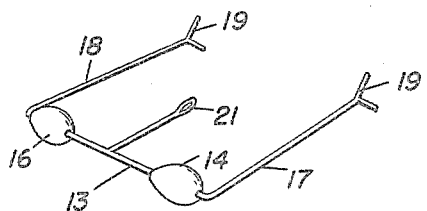
Figure 4:
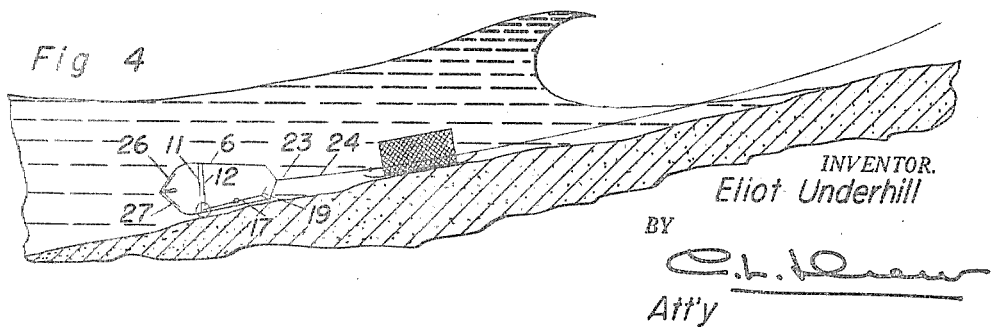

In the accompanying drawings forming a part of this specification and in which like numerals are employed to designate like parts throughout the same, Fig. 1 is a side elevation of my device as the same would appear in use, Fig. 2 is a top-plan view of Fig. 1, Fig. 3 is a perspective view of the holding arms, and Fig. 4 is a side elevation on a reduced scale, showing the device towing a crab net and being propelled by the wave action.

There are many instances where it is desirous of moving or towing a line or net or other object, away from the shore or location where the operator is standing and to a distance greater than can be manually attained; as, for instance, by casting.

I have, therefore, devised a current tow motor which, when attached to a line, will create a drag upon the line and, as the device is propelled away from the operator, the line and any equipment attached thereto will be dragged away from the operator.

Referring to the accompanying drawings, wherein, for the purpose of illustration, is shown a preferred embodiment of my invention, the numerals 5 and 6 designate a pair of spaced frame-like members which are connected together in spaced relation by a rear bow 7, and cross pieces 8 and 9. The frames each have a contour similar to that of a snow shoe; that is, with a bowed front and rear end tapering toward the rear.

Parallel braces 11 and 12, extend across each of the frames 5 and 6, and act as guides for a weighted cross-piece 13, having weights 14 and 16 thereon, which cross piece is, in turn, connected to a pair of rearwardly-extending arms 17 and 18, each of which arms has a forked end, as shown at 19.

A lever 21, is connected through the medium of a line 22, through an eye, not shown, on the cross piece 8, and is then attached to a spring 23, which is, in turn, attached to the tow line 24.

Pivotally mounted in the forward ends of the frames 5 and 6, is a pair of vanes 26 and 27, which have their adjacent edges spaced a short distance apart, the purpose of which will be later seen. These vanes are adapted to open and close with the current action, as shown in full and dotted lines in Fig. 1. When open, the vanes rest against the front bowed ends of the frames 5 and 6, and when closed by gravity or reverse currents, they will lie against the loop 28 of the cross-piece 9, to which they are hinged. This loop is so bent that the vanes cannot entirely close against each other. Therefore, the water can always pass between them to cause an opening action.

In use, the device is dropped into the water where there is a current, caused either by the flow of a stream or by the wave action, as shown in Fig. 4. Assuming that the device is being driven by wave action, as soon as the device is placed in the water, irrespective of which side it comes to rest; that is, top or bottom, as shown in Fig. 1, the weighted cross-piece 13 and the weights 14 and 16, will fall to the bottom of the slot formed by the parallel braces 11 and 12, thus causing the holding arms to rest upon the ground or beach, as shown in dot-and-dash lines in Fig. 1.

Now, assuming that, due to wave action, there is an undertow moving away from the beachhead, the current movement will be such that it will cause the vanes 26 and 27, to assume the full-line position of Fig. 1 and thus move the device forwardly, or toward the left of the drawing. Any backward movement of the water when the undertow stops and the waves start to roll in will result in the forked ends 19 of the holding arms burying themselves in the ground, as shown in full lines in Fig. 1, thus preventing any retrograde movement of the device.

In view of the fact that the vanes 26 and 27, have their adjacent edges spaced a slight distance from each other, there will be a cavatation effect formed in front of the vanes, which will materially assist in the forward propulsion of the device.

When it is desired to retrieve the device, pulling upon the line 24, will first stretch the spring 23, and will then pull upon the line 22, and raise the lever 21, as shown in dotted lines in Fig. 1, thus raising the holding arms so that the entire device may be dragged rearwardly and retrieved.

In Fig. 4 I have shown a crab net as being attached to the device, whereby the crab net will be dragged a considerable distance off shore. Of course, any other equipment could be attached in place of the crab net. Also, releasing devices may be secured between the tow motor and the equipment being dragged out, whereby the motor may serve to drag out a number of pieces of equipment and then be retrieved, leaving the equipment in position; as, for instance, shore mines to protect a beach-head.

It will thus be seen that I have created a device which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. A current tow motor comprising a pair of spaced frames having bowed front and rear ends, and tapering from the front end toward the rear end, each of said frames having parallel braces secured thereto, a weighted cross piece freely movable between said parallel braces, rearwardly-extending arms secured to said weighted cross piece, the ends of said arms being forked to prevent retrograde movement of said motor, and vanes secured to said motor, said vanes being acted upon by a fluid current to propel said device forwardly.

2. A current tow motor comprising a pair of spaced frames having bowed front and rear ends, and tapering from the front end toward the rear end, each of said frames having parallel braces secured thereto, a weighted cross piece freely movable between said parallel braces, rearwardly-extending arms secured to said weighted cross piece, the ends of said arms being forked to prevent retrograde movement of said motor, vanes secured to said motor, said vanes being acted upon by a fluid current to propel said device forwardly, a lever connected to said cross-piece and a line connected to said motor and to said lever, whereby the pull on said line will raise said lever and said arms to permit retrograde movement of said motor.

3. A current tow motor comprising a pair of spaced frames, each frame having a bowed front and rear end tapered from the front to the rear, a pair of vanes pivotally mounted in the forward bow of said frames, means for preventing said vanes from closing against each other, a weighted cross-piece slidably supported in said frames and having rearwardly-extending forked arms, a lever connected to said cross-piece, a line extending from said lever and supported between said frames, a spring connected to said line, the opposite end of said spring being connected to a tow line, whereby pull on said tow line greater than the strength of said spring, will cause said first-mentioned line to raise said lever and said rearwardly-extending forked arms.

ELIOT UNDERHILL.

REFERENCES CITED

The following references are of record in the file of this patent:

UNITED STATES PATENTS

| Number | Name | Date |
|---|---|---|
| 2,021,815 | Strout | Nov. 19, 1935 |
| 2,161,215 | Wise | June 6, 1939 |